July 15, 1941.  J. DOUCETTE  2,249,077
MOISTURE SEPARATING APPARATUS
Filed Oct. 30, 1939
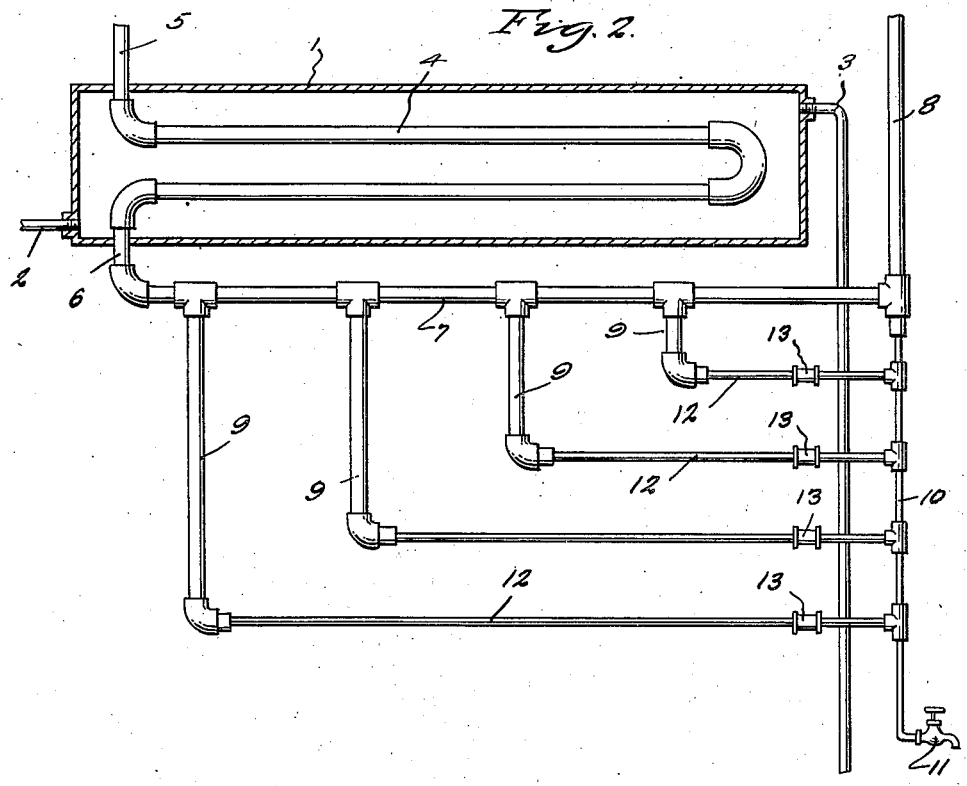
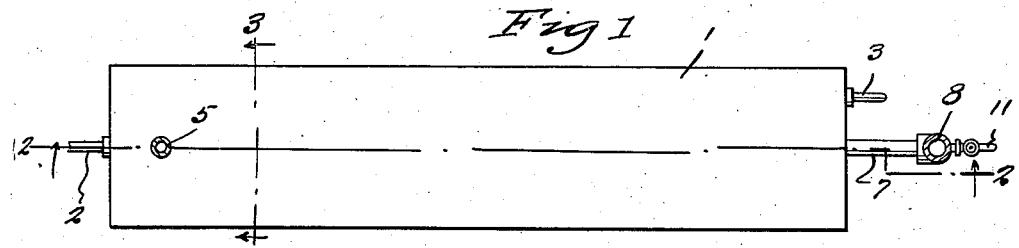
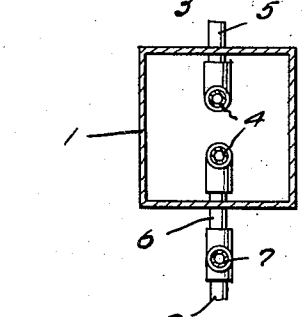
Inventor
Joseph Doucette
By Clarence A. O'Brien
and Hyman Berman
Attorneys Patented July 15, 1941

2,249,077

UNITED STATES PATENT OFFICE 2,249,077

MOISTURE SEPARATING APPARATUS

Joseph Doucette, Hillside, Ill.

Application October 30, 1939, Serial No. 302,034

1 Claim. (Cl. 137—78)

This invention pertains to new and useful improvements in means for separating excess moisture from air or other gases and has for its primary object to provide a novel combination and arrangement of manifold, traps, etc., through the medium of which the removal of the moisture will be accomplished in a highly efficient manner.

Other objects of the invention are to provide an air and moisture separating apparatus of the character described which will be comparatively simple in construction, strong, durable, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a top plan view of an embodiment of the present invention.

Figure 2 is a view in vertical longitudinal section through the apparatus, taken substantially on the line 2—2 of Fig. 1.

Figure 3 is a cross sectional view, taken substantially on the line 3—3 of Fig. 1.

Referring now to the drawing in detail, it will be seen that the embodiment of the present invention which has been illustrated comprises a horizontally elongated tank 1 for the reception of a suitable cooling agent, such as water. A supply pipe 2 is connected to the lower portion of the tank 1 at one end thereof. Connected to the upper portion of the tank 1 at the other end thereof is an overflow pipe 3.

Mounted in the tank 1 is an elongated condenser coil 4. An intake lead 5 connects the coil 4 to a source of air under pressure from which moisture is to be separated. The lead 5 passes through the top of the tank 1. The other end of the coil 4 is connected by a discharge lead 6 to a manifold 7 located beneath the tank 1. One end of the manifold 7 is connected to a dry air delivery pipe 8.

Depending from the manifold 7 at longitudinally spaced points are branches constituting moisture traps 9. It will be observed that the traps 9 progressively decrease in length from the first to the last thereof. Depending from the air delivery pipe 8 and communicating therewith is a condensed moisture discharge pipe 10 which, it will be noted, is considerably smaller than said pipe 8. A release valve 11 is provided on the lower end of the pipe 10. Conduits 12 connect the lower ends of the traps 9 to the pipe 10, said conduits comprising sections or lengths of pipe joined by suitable unions 13.

It is thought that the operation of the apparatus will be readily apparent from a consideration of the foregoing. Briefly, the water or other cooling agent from a suitable source of supply fills the tank 1 from the pipe 2 to the level of the overflow pipe 3 thus covering the coil 4. The air under pressure passes through the comparatively cold coil 4 and the excess moisture in said air is rapidly condensed. The air and condensed moisture enter the manifold 7 from the coil 4, the air flowing past the traps 9 to the delivery pipe 8, the moisture dropping into said traps from which it is conducted to the pipe 10 by the conduits 12. Condensed moisture that may still be in the air when it reaches the delivery pipe 8 may flow downwardly into the pipe 10. The condensed moisture may be drained from the apparatus when desired by simply opening the valve 11. If but a single trap 9 were provided, the rapidly expanding air from the coil 4 would carry a considerable portion of the condensate past said trap. However, the series of spaced traps 9 permit the moisture to condense and separate from the air substantially throughout the length of the manifold 7 as well as in the coil 4, said traps draining off the moisture as it condenses, thereby preventing it from flowing any considerable distance in said manifold to be again entrained in said air. The progressive shortening of the traps 9 from the first to the last thereof greatly facilitates and reduces the cost of installation, permitting said traps to depend in a straight line from the manifold 7.

It is believed that the many advantages of a moisture separating apparatus constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

Means for separating condensed water vapor from air comprising, in combination, a horizontal manifold having one end extending upwardly from the manifold and connected with a source of air under pressure, a vertical air delivery pipe connected with the other end of said manifold and extending upwardly therefrom, a reduced condensate receiving pipe connected at the junction of the manifold and delivery pipe and depending therefrom, a drain valve on the lower end of said condensate pipe, a plurality of traps, for the reception of condensate, depending from the manifold at longitudinally spaced points, said traps progressively decreasing in length from the first to the last thereof, and conduits connecting the lower ends of the traps at vertically spaced points to the condensate pipe.

JOSEPH DOUCETTE.